No. 694,533. Patented Mar. 4, 1902.
G. W. CROSS.
CHAIN FOR CONVEYERS.
(Application filed Apr. 17, 1900.)
(No Model.)
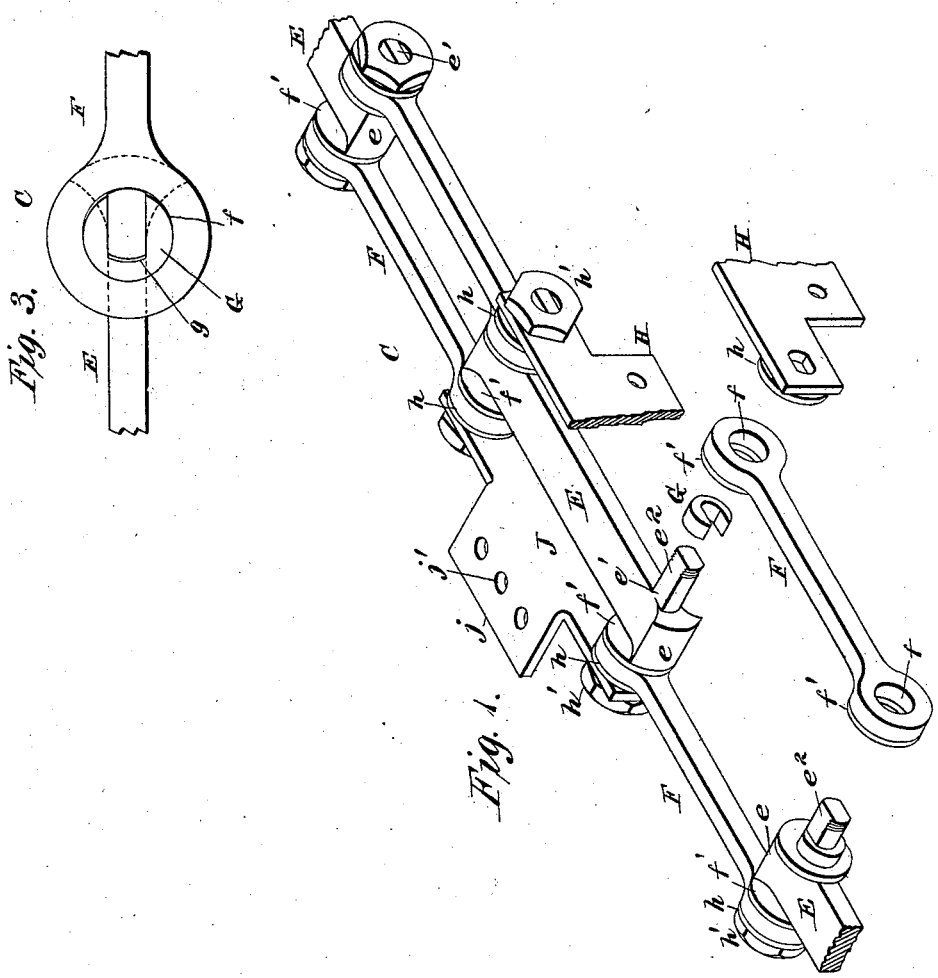
Witnesses:
Inventor
George W. Cross
By Dyer, Edmunds & Dyer
Att'ys.

UNITED STATES PATENT OFFICE.

GEORGE W. CROSS, OF CARBONDALE, PENNSYLVANIA.

CHAIN FOR CONVEYERS.

SPECIFICATION forming part of Letters Patent No. 694,533, dated March 4, 1902.

Application filed April 17, 1900. Serial No. 13,175. (No model.)

*To all whom it may concern:*

Be it known that I, GEORGE W. CROSS, a citizen of the United States, residing at Carbondale, in the county of Lackawanna and State of Pennsylvania, have invented a certain new and useful Improvement in Chains for Conveyers, &c., of which the following is a specification.

This invention relates to improvements in chains adapted particularly for use in connection with conveyers for moving material in bulk; and the object of the invention is to provide a chain for this purpose which is simple in construction, durable in use, and capable of adjustment to compensate for wear.

The conveyer-chain is made up of separable metallic links each section of which is or certain sections of which are provided with means of adjustment to take care of variation in length due to the friction of the wearing parts. To this chain are directly secured the flights which operate within the trough, the latter being supported in any suitable manner—such, for instance, as by means of the conveyer-frame.

The invention is illustrated in the accompanying drawings, in which—

Figure 1 is an enlarged perspective view illustrating the construction of one of the conveyer-chains. Fig. 2 is a rear elevation illustrating the application of the chain of this invention to an elevator-bucket. Fig. 3 is a detail view hereinafter to be referred to.

Each of the conveyer-chains is made up of alternate one-part and two-part links pivotally connected in order to secure requisite flexibility. Thus E designates a one-part link the ends of which, $e$, are preferably increased in dimensions to furnish wearing-surfaces with which coact the teeth E' of the driving sprocket-wheels $E^2$. At or adjacent to each end of the link E are the pivots $e'$, here shown as flattened on their upper and lower surfaces at $e^2$ and screw-threaded adjacent to their ends. Coacting with this one-part link and pivotally mounted upon the pivots $e'$ are the two-part or strap links F, each of which is enlarged at both ends and provided with a perforation $f$ to receive a link-pivot $e'$. In securing these strap-links upon the pivots $e'$ I preferably interpose between them and the links E washers $f$, these being provided with a central perforation of substantially the shape of the link-pivots. The strap-links, however, are not directly mounted upon the pivots $e'$, but upon detachable eccentric bearing-rings G. (Shown in Fig. 1 and in the detail view, Fig. 3.) As here shown, the ring G is open-sided, being formed with an elongated slot of such size as to permit each ring to be placed upon a pivot $e'$ and to fit the same snugly. The periphery of the ring G, together with that portion of the periphery of the pivot $e'$ which is exposed, form a circular wearing-surface with which coacts the circular perforation in the end of each of the strap-links F. The relation of the parts as thus described is illustrated in detail in Fig. 3.

The office of the eccentric bearing-rings G is to furnish means for ready and quick adjustment in the length of the conveyer-chains without discarding worn parts. As will be readily understood, the wear of the strap-links F is received upon the periphery of the eccentric rings G, this friction in time tending to change the form of the perforations $f$ from substantially a circle to substantially an oval. As a result of course the pitch of the chain is increased proportionately to the amount of wear, and unless means were provided for compensating for this increase in pitch coaction between the chain and the teeth of the driving sprocket-wheels would be seriously interfered with. In the present invention this wear of the surfaces is provided for by changing the position of the eccentric rings G (or certain of them) relatively to the pivots $e'$, upon which they are carried. This is done by means of inserting between the interior of the rings and the exterior of the pivots shims $g$, the effect of this being to substantially restore the original relativity between the strap-links and the link-pivots.

To the chain or chains made up as above described are attached the flights of a conveyer or the buckets of an elevator. For this purpose I provide supporting media secured to the chain, preferably as here shown, adjacent to the one-part links thereof and carried by the pivots formed integral with those links. Thus in Fig. 1, in which the chain is illustrated in the form in which I prefer to construct it for use in a conveyer, H designates a strap perforated at either end to receive the ends of the link-pivots $e'$ outside the straps F, forming the two-part links of the chain. As here shown, I preferably employ washers $h$ between the strap-links F and the supporting-straps H and secure the latter in position upon the pivots $e'$ by means of nuts $h'$. These straps H, which are thus connected to the chain, support the conveying elements in any suitable way. If desired, straps J, mounted upon the link-pivots $e'$, may be employed each with a projecting wing $j$, having bolt-holes $j'$ therein for receiving bolts by means of which supporting-shoes may be secured to said wings. In Fig. 2 a strap J is shown mounted on both sides of the chain carrying wings $j'$ for supporting an elevator-bucket K. Thus when the chain is employed for supporting conveying devices straps H will be carried at one side of the chain and when employed for supporting elevator-buckets straps J, arranged as explained, will be carried on both sides of the chain.

What I claim is—

1. A chain comprising a series of one-part links each having two pivot-pins at each end arranged in line with each other, a bushing eccentrically arranged with respect to and detachably carried by each pivot-pin, and connecting-links mounted on said bushings to connect the one-part links together, substantially as set forth.

2. A chain comprising a series of one-part links each having two pivot-pins at each end arranged in line with each other, an open bushing eccentrically arranged with respect to and detachably carried by each pivot-pin, and connecting-links mounted on said bushings to connect the one-part links together, substantially as set forth.

3. A chain comprising a series of one-part links, each having two pivot-pins at each end arranged in line with each other, a bushing detachably carried on each pivot-pin, connecting-links mounted on said bushings to connect the one-part links together, and means for adjusting said bushings with respect to the pivot-pins, substantially as set forth.

4. A chain comprising a series of one-part links each provided with two flattened pivot-pins at each end, a non-rotating bushing fitting each pin, and connecting-links mounted on said bushings for connecting the one-part links together, substantially as set forth.

5. A chain comprising a series of one-part links each provided with two flattened pivot-pins at each end, a non-rotating open bushing fitting each pin and mounted eccentrically thereon, and connecting-links mounted on said bushings for connecting the one-part links together, substantially as set forth.

6. A chain comprising a plurality of links, one of said links carrying an adjustable and detachable bushing upon which another link is mounted, substantially as described.

7. A chain comprising a plurality of links, one of said links carrying a detachable bushing upon which another link is mounted, and means for adjusting said bushing relatively to the link by which it is carried, substantially as described.

8. In a chain, a link having pivots, bearing-rings carried thereby, shims for adjusting said rings relatively to said pivots, and a link mounted on said rings, substantially as described.

9. In a chain, a link having a pivot with two flat faces, a detachable bearing-ring having a recess of substantially the same form and carried by said pivot, and a link mounted upon said ring, substantially as described.

10. A chain comprising one-part links, each having pivot-pins at its ends, a bushing carried by each of said pins, connecting-links for connecting the one-part links together and mounted on the bushings of the pivot-pins of the successive one-part links, and straps mounted on the pivot-pins of one or more of said links outside of said bushings and arranged coincidently with the one-part links, substantially as set forth.

11. A chain comprising one-part links, each having integral pivot-pins at its ends, a bushing carried by each of said pins, connecting-links for connecting the one-part links together and mounted on the bushings of the pivot-pins of the successive one-part links, and straps depending downwardly in a single plane and mounted on the pivot-pins of one or more of said links outside of said bushings and arranged coincidently with the one-part links, substantially as set forth.

This specification signed and witnessed this 14th day of April, 1900.

GEORGE W. CROSS.

Witnesses:
E. D. YARRINGTON,
J. R. VANDERFORD.